(12) United States Patent
Kirkbride

(10) Patent No.: US 10,822,080 B2
(45) Date of Patent: Nov. 3, 2020

(54) AIRCRAFT AND METHODS OF PERFORMING TETHERED AND UNTETHERED FLIGHTS USING AIRCRAFT

(71) Applicant: The Boeing Company, Chicago, IL (US)

(72) Inventor: David W. Kirkbride, Allyn, WA (US)

(73) Assignee: The Boeing Company, Chicago, IL (US)

( * ) Notice: Subject to any disclaimer, the term of this patent is extended or adjusted under 35 U.S.C. 154(b) by 323 days.

(21) Appl. No.: 16/022,537

(22) Filed: Jun. 28, 2018

(65) Prior Publication Data

US 2020/0001993 A1    Jan. 2, 2020

(51) Int. Cl.
*B64C 39/02*     (2006.01)
*B64D 27/24*     (2006.01)
*B64F 3/02*      (2006.01)
*B64C 27/20*     (2006.01)
*B60L 5/04*      (2006.01)
(Continued)

(52) U.S. Cl.
CPC .............. *B64C 39/022* (2013.01); *B60L 5/04* (2013.01); *B64C 27/20* (2013.01); *B64C 27/52* (2013.01); *B64D 27/24* (2013.01); *B64F 3/02* (2013.01); *B60L 2200/10* (2013.01); *B64C 39/024* (2013.01); *B64C 2201/066* (2013.01); *B64C 2201/108* (2013.01); *B64C 2201/126* (2013.01); *B64C 2201/128* (2013.01); *B64C 2211/00* (2013.01); *B64D 2027/026* (2013.01)

(58) Field of Classification Search
CPC ............ B64C 39/022; B64C 2201/148; B64C 2201/042; B64C 2201/06; B64F 3/02; B61B 7/06; B61B 3/00; B61B 7/00; B60L 5/04
See application file for complete search history.

(56) References Cited

U.S. PATENT DOCUMENTS

| 1,733,270 A | * | 10/1929 | Messer | ............... B61B 15/00 191/12 R |
| 3,260,479 A | * | 7/1966 | Eickmann | ............. B64C 27/12 244/17.13 |

(Continued)

FOREIGN PATENT DOCUMENTS

WO     WO-2019007586 A1 * 1/2019 ............. B60L 50/53

*Primary Examiner* — Richard G Davis
(74) *Attorney, Agent, or Firm* — Kwan & Olynick LLP

(57) ABSTRACT

Disclosed are aircraft configured to perform tethered and untethered flights as well as methods of operating such aircraft. During a tethered flight, the aircraft is connected to a power line using its connecting module. While tethered, the aircraft can receive electrical energy from the power line and use this energy for propulsion and/or storage. The aircraft comprises a propulsion module for providing vertical and horizontal thrusts. In some examples, the aircraft comprises a transport module. The transport module may be removably attached to the propulsion module and be replaceable with another transportation module. During an untethered flight, the electrical energy is supplied to the propulsion module from a battery and/or a generator on board of the aircraft. The untethered flight capability can be used for landing and takeoff, flying away from power lines or when the power line is not operational, and other like examples.

20 Claims, 15 Drawing Sheets

(51) Int. Cl.
    *B64C 27/52* (2006.01)
    *B64D 27/02* (2006.01)

(56) References Cited

U.S. PATENT DOCUMENTS

| | | | | |
|---|---|---|---|---|
| 3,715,991 | A * | 2/1973 | Boyd | B64F 3/02 |
| | | | | 104/23.1 |
| 4,036,147 | A * | 7/1977 | Westling | B61B 15/00 |
| | | | | 104/23.1 |
| 9,421,869 | B1 * | 8/2016 | Ananthanarayanan | B64D 5/00 |
| 9,878,787 | B2 * | 1/2018 | Chan | B60L 53/126 |
| 10,186,348 | B2 * | 1/2019 | Davis | H02G 1/02 |
| 10,351,234 | B1 * | 7/2019 | Dennis | B64C 27/08 |
| 10,384,777 | B1 * | 8/2019 | Welsh | B64F 3/02 |
| 10,491,021 | B1 * | 11/2019 | Syracuse | H04W 4/025 |
| 2017/0015414 | A1 * | 1/2017 | Chan | H02G 1/02 |
| 2018/0095468 | A1 * | 4/2018 | Yang | B64C 25/52 |
| 2018/0244367 | A1 * | 8/2018 | Kiesewetter | B64C 9/14 |
| 2019/0135113 | A1 * | 5/2019 | Koo | B60L 5/005 |
| 2019/0233107 | A1 * | 8/2019 | Tian | B64C 39/08 |

\* cited by examiner

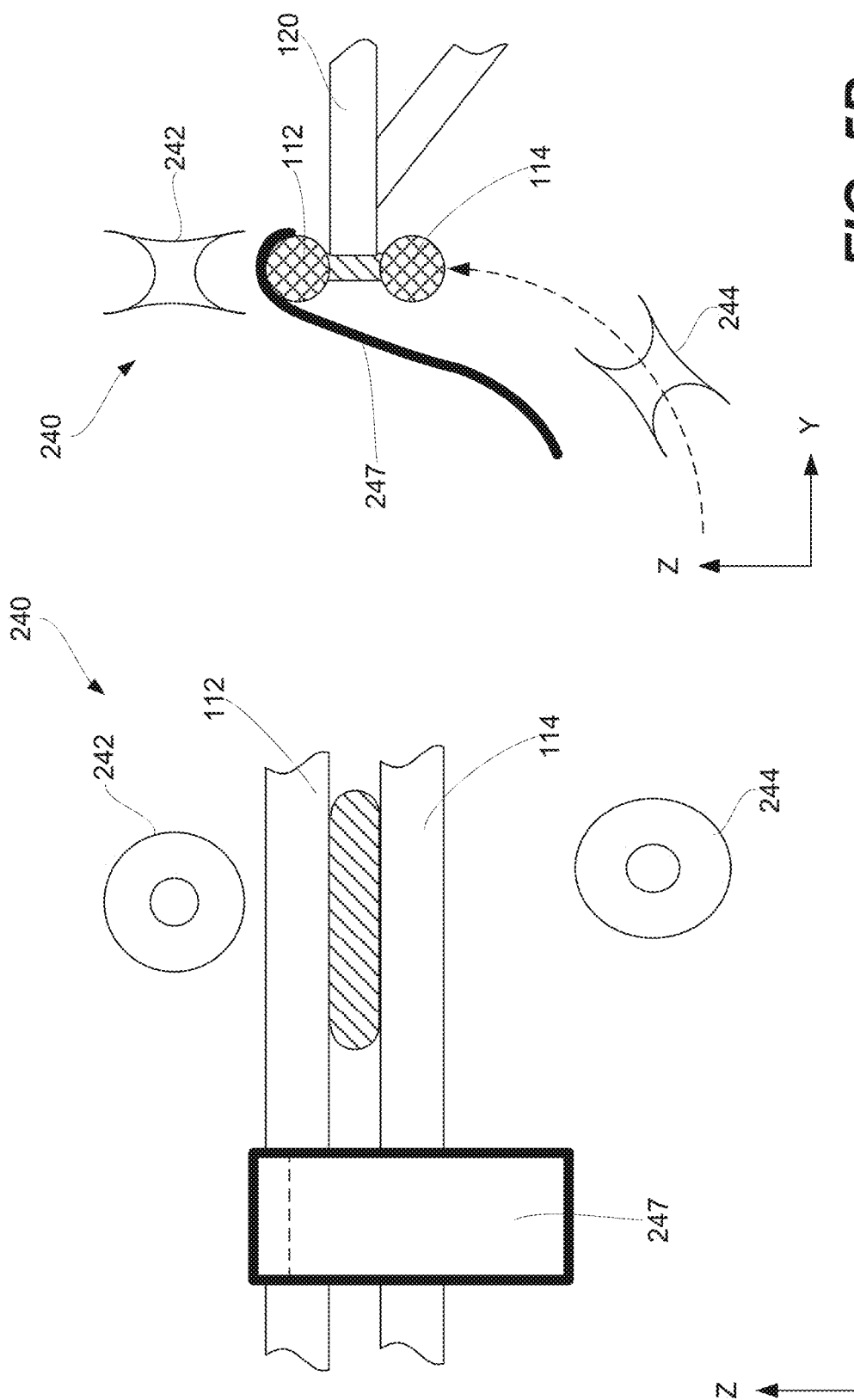

AIRCRAFT AND METHODS OF PERFORMING TETHERED AND UNTETHERED FLIGHTS USING AIRCRAFT

TECHNICAL FIELD

Disclosed are aircraft configured to perform tethered and untethered flights, systems utilizing such aircraft, and methods of operating such aircraft.

BACKGROUND

Highways, railways, waterways, and other types of transportation infrastructure can be very expensive and difficult to build, especially in some topographies (e.g., mountains, rivers, swaps) and climates. These limitations have held development of many parts of the world. Another major development factor is availability of electrical power. Distribution of electrical power is typically performed using overhead power lines, which form electrical power grids. A grid is considered to be a separate and independent infrastructure from a transportation system, positioned in the same general area. For example, a grid may be built and operated independently from a transportation system. Minimal, if any, integration currently exists between conventional transportation and electrical power distribution systems. At the same time, the cost of building and maintaining each system can be significant.

SUMMARY

Disclosed are aircraft configured to perform tethered and untethered flights as well as methods of operating such aircraft. During a tethered flight, the aircraft is connected to a power line using its connecting module. While tethered, the aircraft can receive electrical energy from the power line and use this energy for propulsion and/or storage. The aircraft comprises a propulsion module for providing vertical and horizontal thrusts. In some examples, the aircraft comprises a transport module. The transport module may be removably attached to the propulsion module and be replaceable with another transportation module. During an untethered flight, the electrical energy is supplied to the propulsion module from a battery and/or a generator on board of the aircraft. The untethered flight capability can be used for landing and takeoff, flying away from power lines or when the power line is not operational, and other like examples.

Illustrative, non-exclusive examples of inventive features according to present disclosure are described in following enumerated paragraphs:

A1. Aircraft 200 configured to perform a tethered flight and an untethered flight, aircraft 200 comprising:

propulsion module 210, comprising vertical thruster 220 configured to generate lift;

connecting module 240, coupled to propulsion module 210 and configured to form power connection with power line 110 during the tethered flight to transmit electrical energy from power line 110 to propulsion module 210; and transport module 280, coupled to propulsion module 210 and configured to transport one or more of cargo and passengers.

A2. Aircraft 200 of paragraph A1, wherein transport module 280 is detachably coupled to propulsion module 210.

A3. Aircraft 200 of paragraph A1 or A2, wherein transport module 280 is selected from the group consisting of passenger transport module 280a, container transport module 280b, and ore transport module 280c.

A4. Aircraft 200 of any one of paragraphs A1-A4, further comprising battery 250, electrically coupled to connecting module 240 and vertical thruster 220, wherein battery 250 is configured to charge during the tethered flight using the electrical energy received from connecting module 240.

A5. Aircraft 200 of paragraph A4, further comprising electrical generator 226 coupled to battery 250 and configured to generate electrical energy to charge battery 250 using internal combustion engine 228.

A6. Aircraft 200 of any one of paragraphs A1-A5, wherein propulsion module 210 further comprises module frame 212, wherein rotational axis of thrust rotor 222 of vertical thruster 220 is pivotable relative to module frame 212.

A7. Aircraft 200 of paragraph A6, wherein module frame 212 surrounds thrust rotor 222.

A8. Aircraft 200 of any one of paragraphs A1-A7, wherein connecting module 240 is configured to form an inductive connection with power line 110 during tethered flight.

A9. Aircraft 200 of any one of paragraphs A1-A8, wherein connecting module 240 is configured to form direct mechanical connection with power line 110 during the tethered flight.

A10. Aircraft 200 of paragraph 9, wherein connecting module 240 comprises connector 241 comprising support 243 and contact 242, wherein contact 242 is rotatably coupled to support 243, and wherein support 243 is coupled to propulsion module 210.

A11. Aircraft 200 of paragraph 10, wherein connector 241 further comprises additional contact 244, wherein additional contact 244 is rotatably coupled to support 243.

A12. Aircraft 200 of paragraph 11, wherein connector 241 further comprises coupling mechanism 245, controlling position of contact 242 and additional contact 244 relative to each other.

A13. Aircraft 200 of paragraph 12, wherein coupling mechanism 245 is configured to urge contact 242 and additional contact 244 toward each other when connecting module 240 forms the direct mechanical connection with power line 110 during the tethered flight.

A14. Aircraft 200 of paragraph 10, wherein connector 241 further comprises gyro-mechanism 214, wherein gyro-mechanism 214 pivotably couples support 243 of connecting module 240 to propulsion module 210 such that support 243 is free to swivel relative to propulsion module 210.

A15. Aircraft 200 of paragraph 14, wherein gyro-mechanism 214 is configured to maintain the direct mechanical connection between connecting module 240 and power line 110 during the tethered flight, while position of aircraft 200 relative to power line 110 changes.

A16. aircraft 200 of paragraph 9, wherein connecting module 240 further comprises locating mechanism 247, wherein locating mechanism 247 is configured to engage power line 110 and to control position of connecting module 240 relative to power line 110 prior to forming the direct mechanical connection with power line 110, and wherein locating mechanism 247 has a hook-shape.

A17. Aircraft 200 of any one of paragraphs A1-A16, further comprising flight controller 270, wherein flight controller 270 is configured to control at least some operations of propulsion module 210 and connecting module 240.

A18. Aircraft 200 of any one of paragraphs A1-A17, further comprising flight controller 270, wherein flight controller 270 is configured to control all operations of propulsion module 210 and connecting module 240.

A19. Aircraft 200 of any one of paragraphs A11-A18, wherein vertical thruster 220 is a part of multiple vertical thrusters, configured to provide multi-axial thrust vectoring.

A20. Aircraft 200 of any one of paragraphs A1-A19, wherein propulsion module 210 comprises horizontal thruster 230, wherein horizontal thruster 230 is configured to provide thrust.

B. Method 700 of operating aircraft 200, method 700 comprising:

performing untethered flight of aircraft 200, wherein aircraft comprises propulsion module 210, connecting module 240, and transport module 280, wherein propulsion module 210 comprises vertical thruster 220 generating lift during the untethered flight, and wherein transport module 280 is coupled to propulsion module 210 and transports one or more of cargo and passengers;

forming an electrical connection between aircraft 200 and power line 110 using connecting module 240, wherein connecting module 240 is coupled to propulsion module 210; and performing tethered flight of aircraft 200 while maintaining the electrical connection between power line 110 and aircraft 200, wherein connecting module 240 transmits the electrical energy from power line 110 to propulsion module 210 during tethered flight.

B2. Method 700 of paragraph B1, further comprising breaking the electrical connection between aircraft 200 and power line 110 and performing an untethered flight of aircraft 200 after breaking the electrical connection.

B3. Method 700 of any one of paragraphs B1-B2, further comprising attaching transport module 280 to propulsion module 210 prior to performing untethered flight of aircraft 200.

B4. Method 700 of any one of paragraphs B1-B3, wherein performing the untethered flight of aircraft 200 comprises supplying electrical energy from battery 250 to vertical thruster 220.

B5. Method 700 of any one of paragraphs B1-B4, wherein performing the untethered flight of aircraft 200 comprises generating the electrical energy using electrical generator 226 and supplying the electrical energy from electrical generator 226 to vertical thruster 220.

B6. Method 700 of any one of paragraphs B1-B5, wherein performing tethered flight of aircraft 200 comprises charging battery 250 using part of electrical energy transmitted from power line 110.

These and other examples are described further below with reference to figures.

BRIEF DESCRIPTION OF THE DRAWINGS

The disclosure may best be understood by reference to the following description taken in conjunction with the accompanying drawings, which illustrate various examples of the disclosure.

FIGS. 5A and 5B are schematic illustrations of a locating mechanism of the connecting module of the aircraft, in accordance with some examples.

DETAILED DESCRIPTION

In the following description, numerous specific details are set forth in order to provide a thorough understanding of the presented concepts. The presented concepts may be practiced without some, or all, of these specific details. In other instances, well known process operations have not been described in detail to not unnecessarily obscure the described concepts. While some concepts will be described with the specific examples, it will be understood that these examples are not intended to be limiting.

INTRODUCTION

Installing power lines is generally less complex, less intrusive (e.g., less impactful to the environment), and less expensive than building transportation infrastructure, such as highways, railways, and bridges. Power lines can be installed in difficult terrains, such as mountains, swaps, and jungles, where building conventional transportation infrastructure may not be practical or possible. However, both electrical power and transportation infrastructure are generally needed for development of new geographical areas.

It has been found that existing/conventional power lines or specially configured power lines can have a dual purpose. One purpose is to transport electric energy from one location to another location. Another purpose is to provide transportation infrastructure for specially designed aircraft. Specifically, a power line can be used by specially designed aircraft as an energy source and/or guidance during aircrafts' tether flights along the power line. The power line can still transport electrical energy and even be a part of a larger electrical grid, in addition to powering/guiding the aircraft. As such, the functionality of existing power lines may be expanded to establish transportation infrastructure for specially designed aircraft. Alternatively, power lines may be specifically configured (e.g., using specific arrangement of conductors, conductor design, voltage rating, position of conductors) to enable tethered flights of aircraft described herein.

Figure 1A:
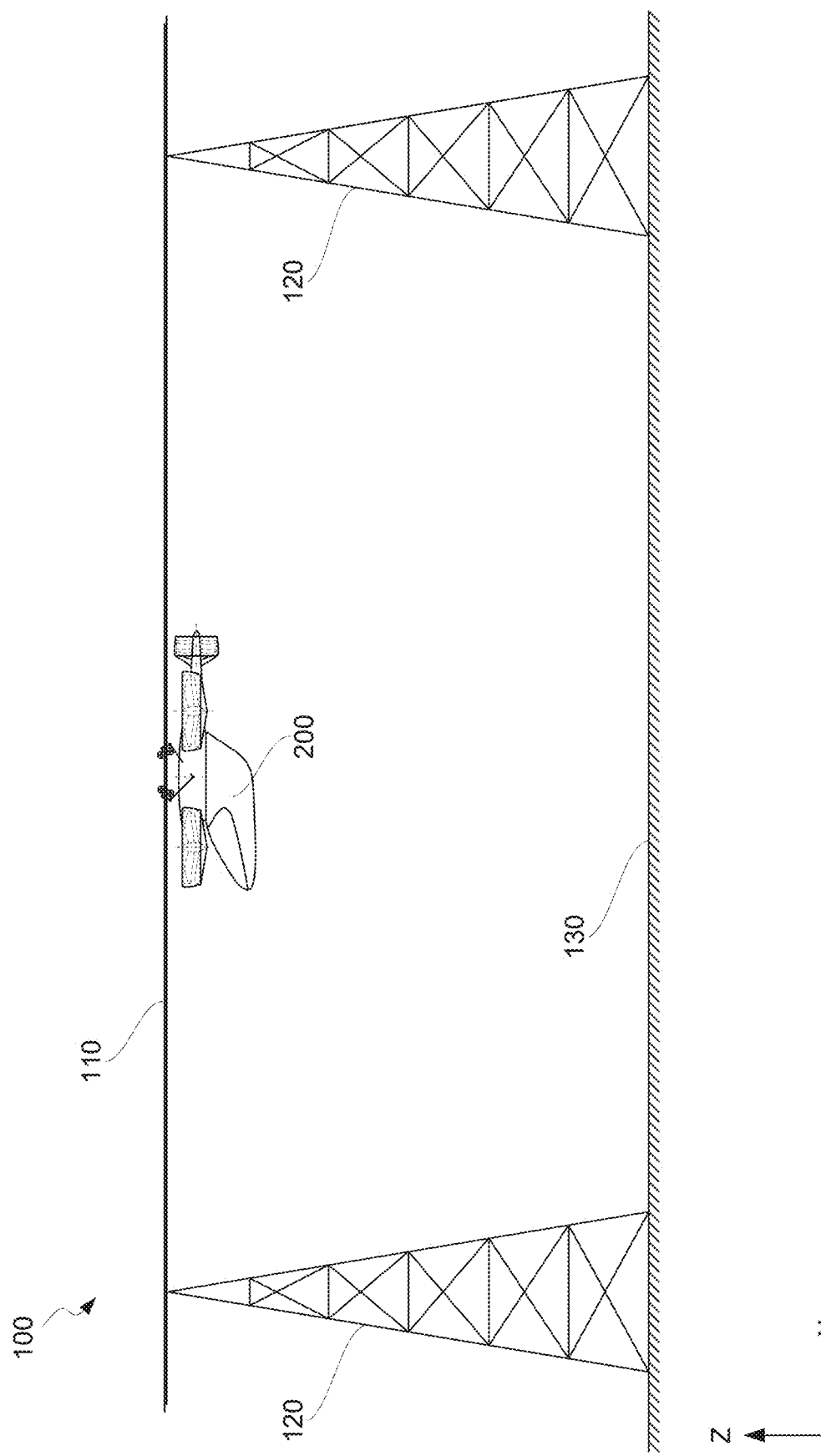
FIG. 1A is a schematic illustration of a system, comprising a power line and an aircraft, performing a tethered flight, while being connected to the power line, in accordance with some examples.
Figure 1B:
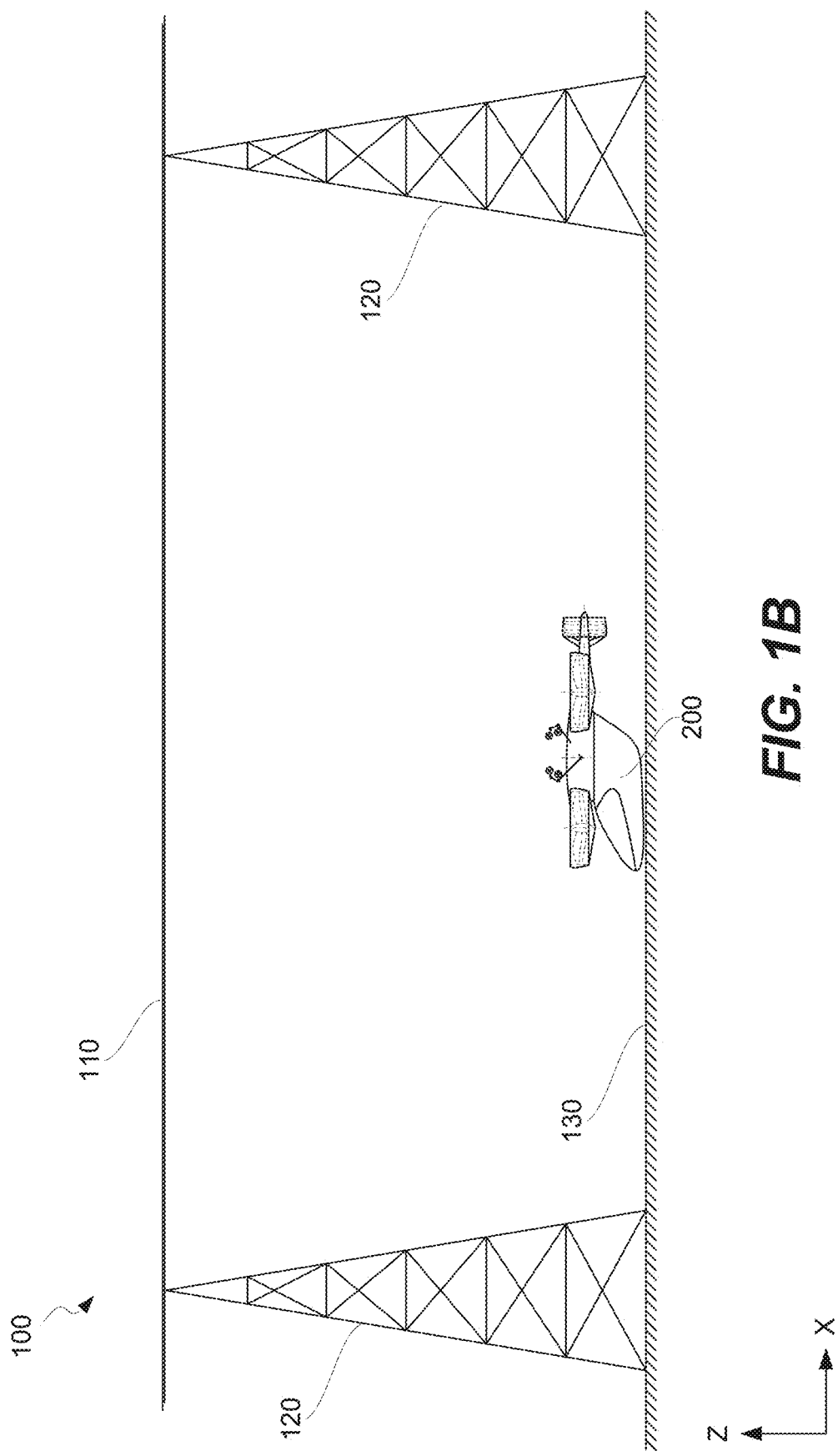
FIG. 1B is a schematic illustration of the system of FIG. 1A, in which the aircraft is untethered from the power line, in accordance with some examples.

System 100, which may be used for this dual-purpose and which may be referred to as a powered wire-way flight system, is schematically shown in FIGS. 1A and 1B. System 100 comprises power line 110 and aircraft 200. As noted above, power line 110 may be an existing power line or a specially configured power line. Power line 110 may be supported using pylons 120, for example, to maintain a certain height from ground 130 as well as to provide safety and other like reasons. In some examples, power line 110 may be partially supported by aircraft 200, while aircraft 200 is connected to power line 110, as further described below with reference to FIGS. 6B and 6C. Various examples of power line 110 are further described below with reference to FIGS. 4A, 4B, 5A, and 5B.

Power line 110 may provide electrical energy to aircraft 200, when aircraft 200 is connected to power line 110, e.g., during tethered flights of aircraft 200 or when aircraft 200 is not in flight. Furthermore, power line 110 may be used to transmit electrical energy along power line 110 between different geographical locations. Another purpose of power line 110 may be providing flight control guidance to aircraft 200.

Aircraft 200 is specifically configured to form and maintain a connection (e.g., a powered connection) to power line 110 during tethered flights of aircraft 200. Furthermore, aircraft 200 is configured to receive electrical energy from power line 110, such connection is present. Aircraft 200 is also configured to perform an untethered flight. Various features of aircraft 200 are further described below.

While one aircraft 200 is shown in FIGS. 1A and 1B, one of ordinary skill in the art would understand that multiple aircraft may be simultaneously connected to power line 110. For example, multiple aircraft may be tethered to power line 110 at different locations along power line 110 and perform their tethered flights while connected to power line 110. When one aircraft, connected to power line 110, passes another aircraft, which is also connected to power line 110, one of these aircraft may temporary disconnect from power line 110 and perform an untethered flight, while the pass is completed. During the untethered flight of aircraft 200, the electrical energy is provided from a battery and/or generator on board of aircraft 200. In general, untethered flights may be used to land aircraft 200 on ground 130, go around obstacles (e.g., pylons 120, other aircraft), switch between different power lines, reach destinations away from power line 110, and other like purposes.

Aircraft Examples

Figure 2A:
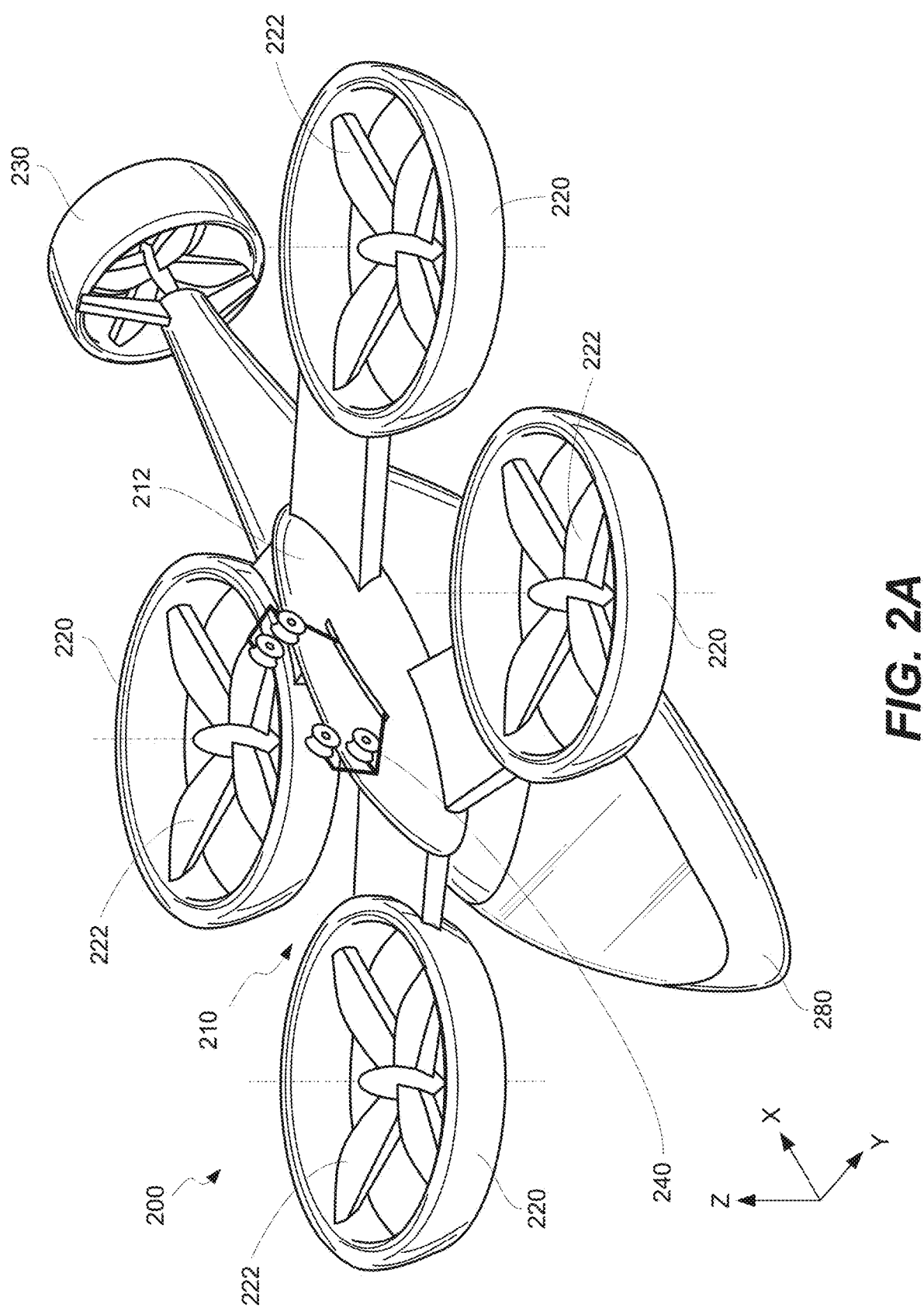
FIG. 2A is a schematic perspective view of an aircraft configured to perform tethered and untethered flights, in accordance with some examples.
Figure 2B:
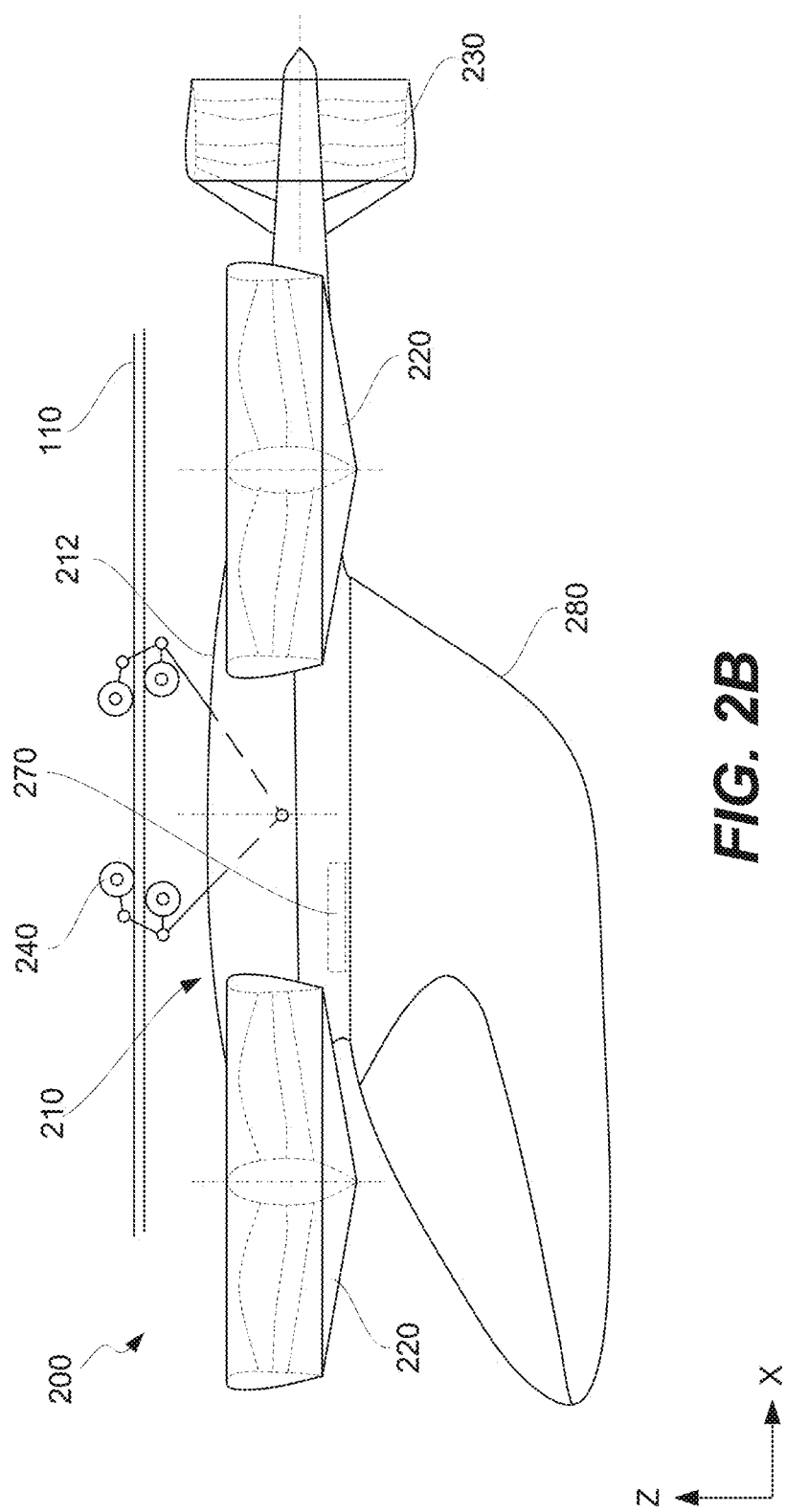
FIG. 2B is a schematic side view of the aircraft of FIG. 2A, in accordance with some examples.

FIGS. 2A and 2B are schematic illustrations of aircraft 200, in accordance with some examples. As stated above, aircraft 200 is configured to perform tethered and untethered flights. During a tethered flight, aircraft 200 is connected (tethered) to power line 110 and may receive electrical energy from power line 110 and/or may use power line 110 for guiding its flight. The electrical energy received from power line 110 may be used for propulsion of aircraft 200 during its flight and/or stored on board of aircraft 200, e.g., for future use during untethered flights. It should be noted that aircraft 200 may be also connected to power line 110 while aircraft 200 is not flying. For example, aircraft 200 may be landed on a platform near power line 110, while aircraft 200 is still connected to power line 110. Alternatively, the connection to power line 110 may be established after aircraft's landing. It should be also noted that aircraft 200 may be connected and perform a tethered flight without receiving any electrical energy from power line 110. In this example, the electrical energy may be provided from a battery and/or a generator on board of aircraft 200, as further described below. The connection to power line 110 may be used for guiding the flight (e.g., positioning and directing aircraft 200 in space) and other like purposes.

Aircraft 200 may form and severe connection to power line 110 during its flight. In other words, aircraft 200 may alternate between tethered and untethered flights. For example, aircraft 200 may form a connection with power line 110 when aircraft 200 requires electrical energy and/or flight guidance. Aircraft 200 may break this connection with power line 110 while landing, going around obstacles (e.g., pylons, other aircraft), switching connections between different power lines, and other like operations. During untethered flights, the electrical energy is provided from the battery and/or the generator on board of aircraft 200.

Figure 2C:
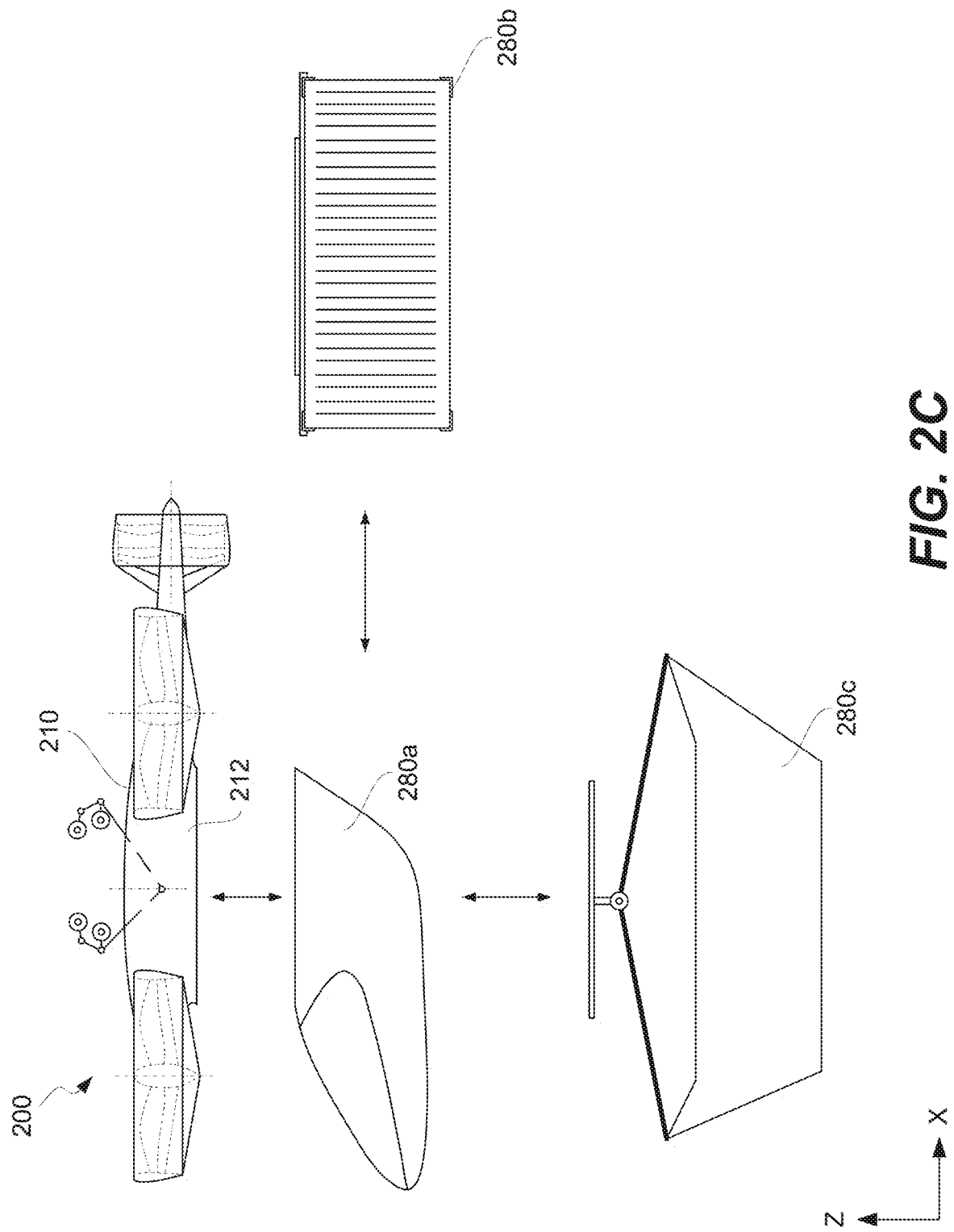
FIG. 2C is a schematic illustration of the aircraft using different examples of a transport module of the aircraft in FIG. 2A.

Referring to FIGS. 2A and 2B, aircraft 200 comprises propulsion module 210 and connecting module 240, coupled to and supported on propulsion module 210. In some examples, aircraft 200 also comprises transport module 280. When present, transport module 280 is coupled to and supported by propulsion module 210. Alternatively, aircraft 200 may be used without transport module 280. For example, aircraft 200, comprising propulsion module 210 and connecting module 240, but not transport module 280, may travel to a destination where transport module 280 is stored and where transport module 280 is added to aircraft 200, e.g., coupled to propulsion module 210. Aircraft 200 may then travel with transport module 280 to a new destination, where transport module 280 may be decoupled from propulsion module 210, e.g., replaced with another transport module. As such, in some examples, transport module 280 is not necessary for operation of aircraft 200. In these examples, a pilot and/or flight controller 270 (e.g., when aircraft 200 is an unmanned aerial vehicle) may be positioned in propulsion module 210. Different examples of transport module 280 may be configured to transport cargo, passengers, or both. Referring to FIG. 2C, some examples of transport module 280 include, but are not limited to, passenger transport module 280a, container transport module 280b, and ore transport module 280c.

In some examples, transport module 280 is detachably coupled to propulsion module 210. For example, transport module 280 may be uncoupled from propulsion module 210 and replaced with another transport module. This detachable transport module feature of aircraft 200 allows using different types of transport module 280 as, for example, schematically shown in FIG. 2C and described above. Furthermore, this feature increases the overall functionality and utility of aircraft 200. For example, this feature allows reducing idle time of aircraft 200. A first transport module may be connected to propulsion module 210 and carried by propulsion module 210 to a destination, where a second transport module is being prepared for connecting to propulsion module 210 (e.g., being loaded or unloaded). Rather than keeping aircraft 200 at that location, while waiting for loading or unloading the transport module, the first transport module is decoupled from propulsion module 210, while the second transport module is coupled.

Propulsion module 210 is configured to generate vertical thrust and/or horizontal thrust during flights of aircraft 200, both tether flights and untethered flights. Referring to FIG. 2A, propulsion module 210 comprises vertical thrusters 220, for generating vertical thrust, which may be also referred to as a lift, or more specifically, variable vertical thrust. In this example, propulsion module 210 is shown to have four vertical thrusters 220. However, propulsion module 210 may have fewer vertical thrusters (e.g., one, two, three) or more vertical thrusters (e.g., five, six, etc.). Propulsion module 210 also comprises horizontal thruster 230 for generating horizontal thrust. In some examples, horizontal thruster 230 provides thrust reversing and/or multi-axis vectoring.

Without being restricted to any particularly theory, it is believed that a combination of multiple vertical thrusters 220 (e.g., four vertical thrusters 220) and horizontal thruster 230 provides precise control of aircraft 200, without excessively increasing its weight. In some examples, each vertical thruster 220 is independently controlled or, more specifically, the rotor speed of each vertical thruster 220 is independently controlled. Using electrical motors in vertical thrusters 220 provides very precise speed control of these rotors. This control aspect is important while establishing connections between aircraft 200 and power line 110 and later during tethered flights of aircraft 200. In these situations, the position of aircraft 200 relative to power line 110 needs to be precisely set and later maintained. It should be noted that various external conditions, such as wind gusts, may influence the position of aircraft 200 and power line 110 relative to each, further emphasizing the importance of the ability to precisely control aircraft 200 during its tethered flights.

In some examples, propulsion module 210 includes module frame 212. Module frame 212 is attached to and supports vertical thruster 220, horizontal thruster 230, and/or other components of propulsion module 210. Module frame 212 may also be used for detachable attachment of transport module 280 to propulsion module 210 as further described with reference to FIG. 2C.

Figure 5C:
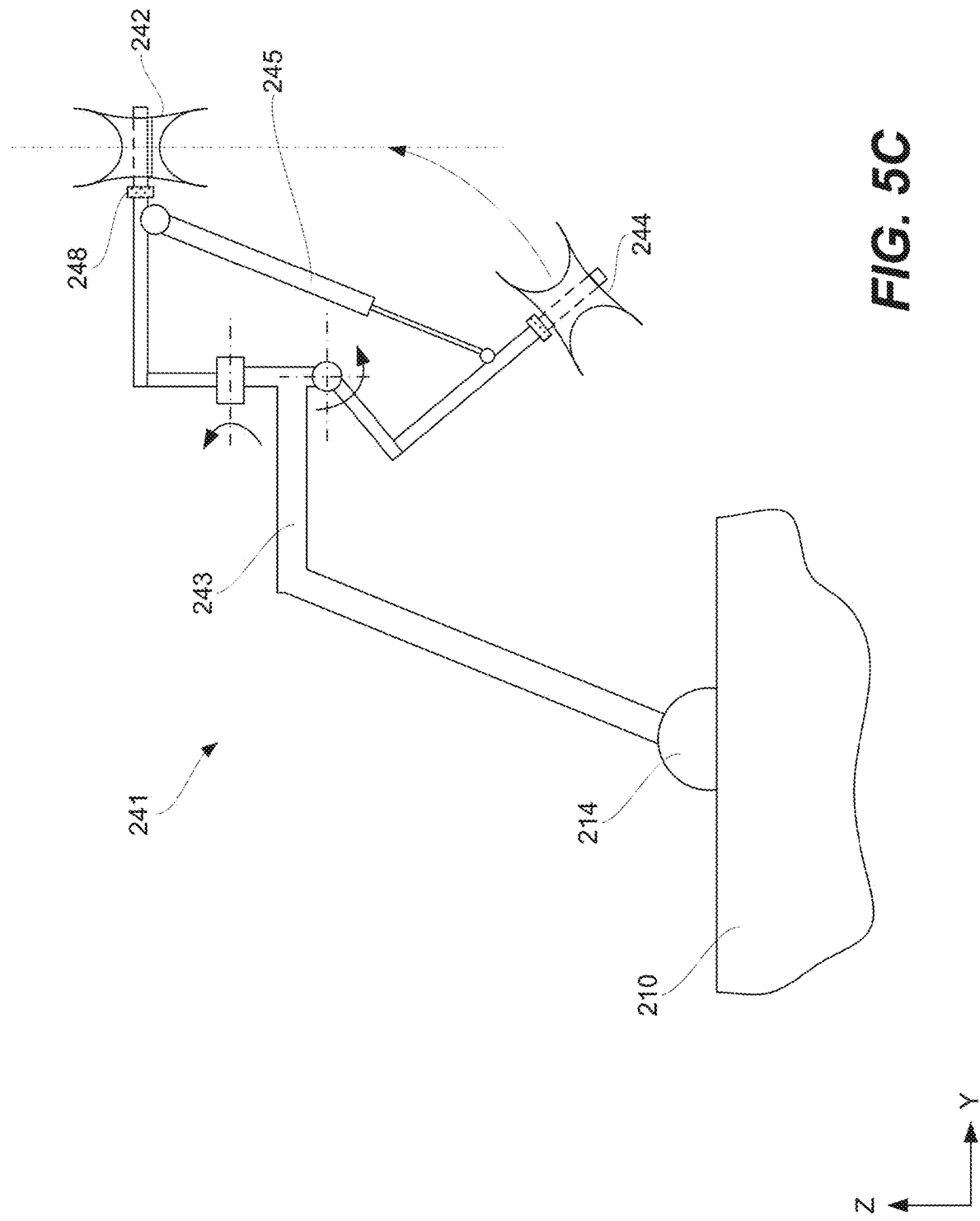
FIG. 5C is a schematic illustration of a gyro-mechanism pivotably, coupling the support of the connecting module to the propulsion module of the aircraft, in accordance with some examples.
Figure 5D:
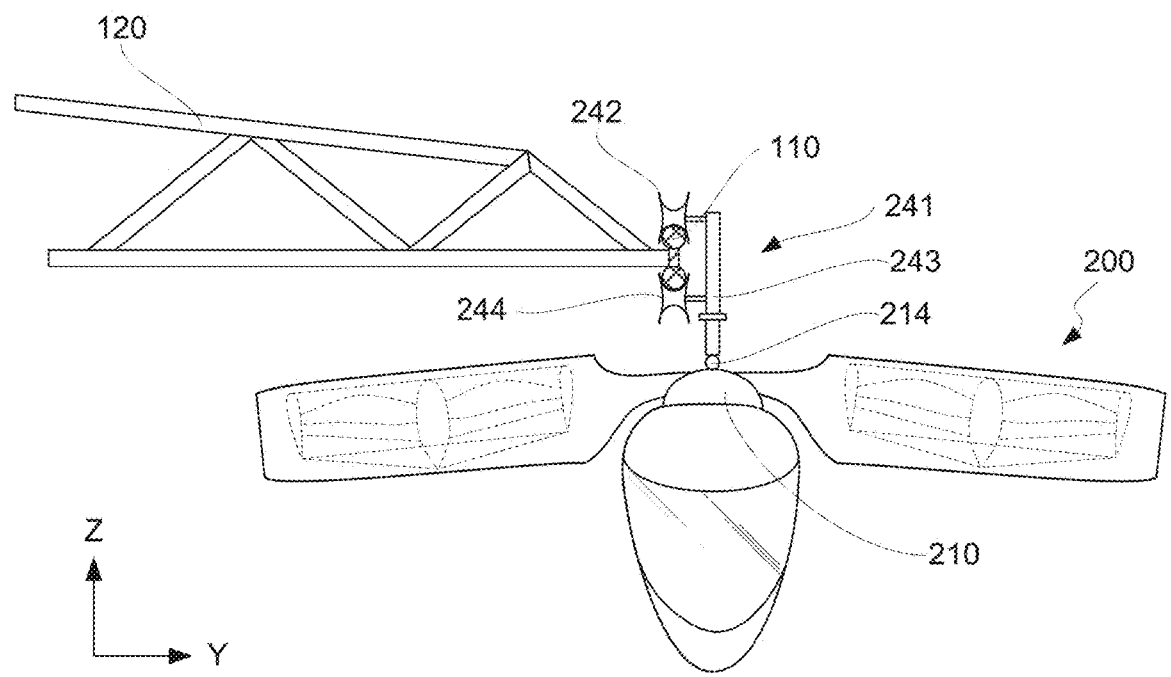
FIGS. 5D and 5E are schematic illustrations of the gyro-mechanism operation allowing different orientations of the aircraft relative to the power line while maintaining connection to the power line, in accordance with some examples.
Figure 5E:
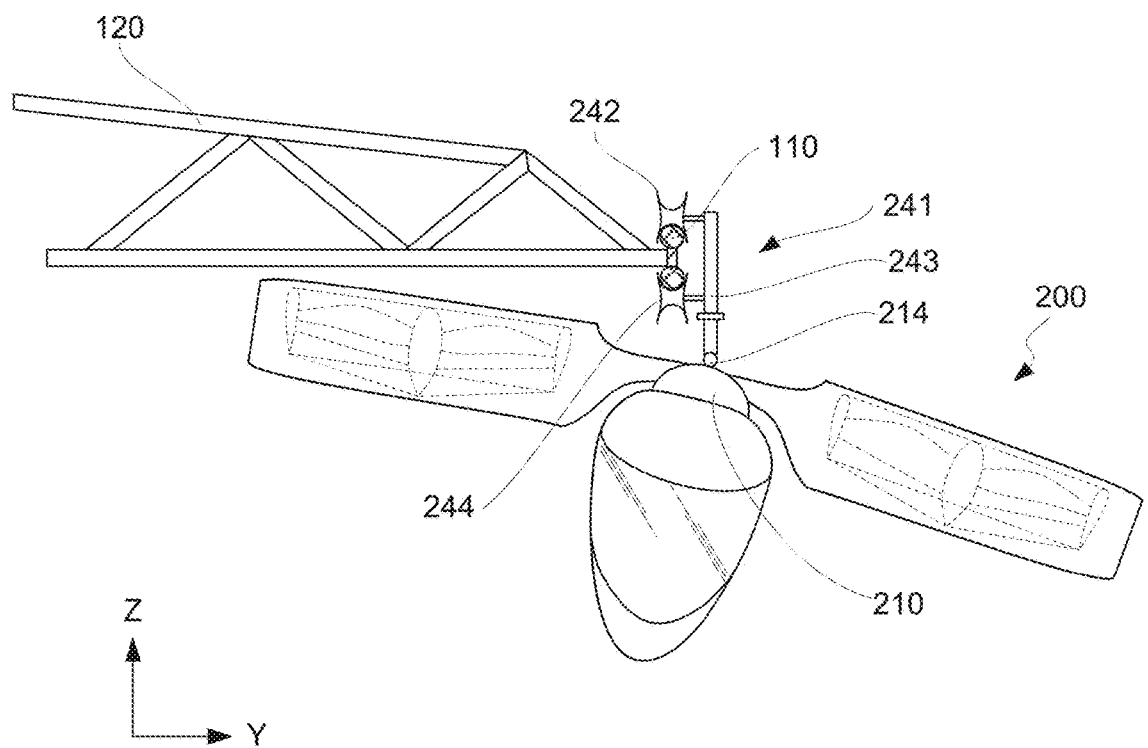
Figure 5F:
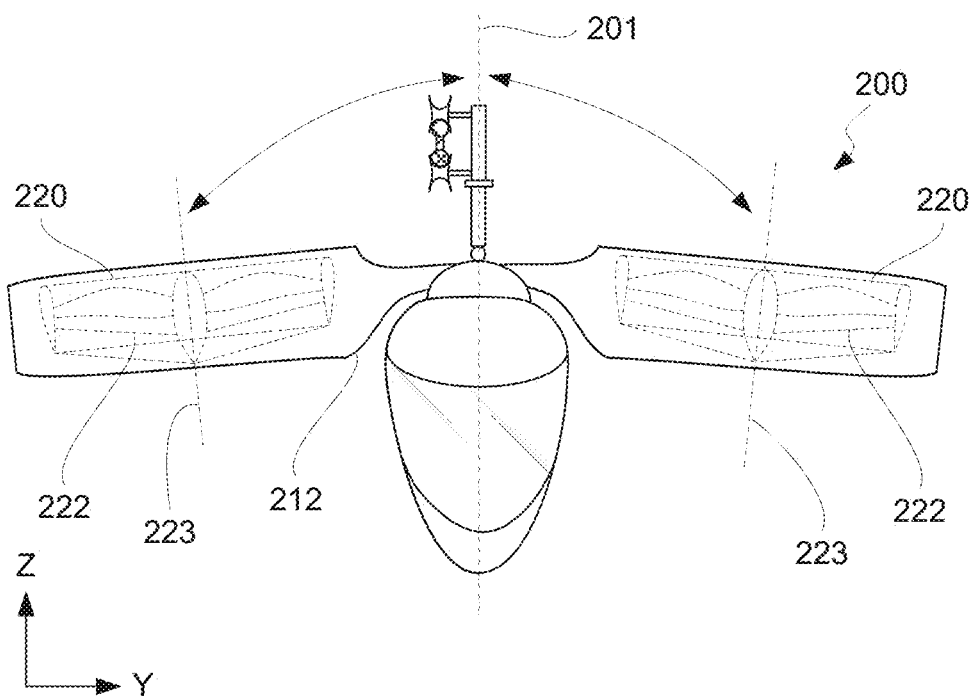
FIGS. 5F and 5G are schematic illustrations of the rotational axes of the thruster, pivoting relative to the module frame, in accordance with some examples.
Figure 5G:
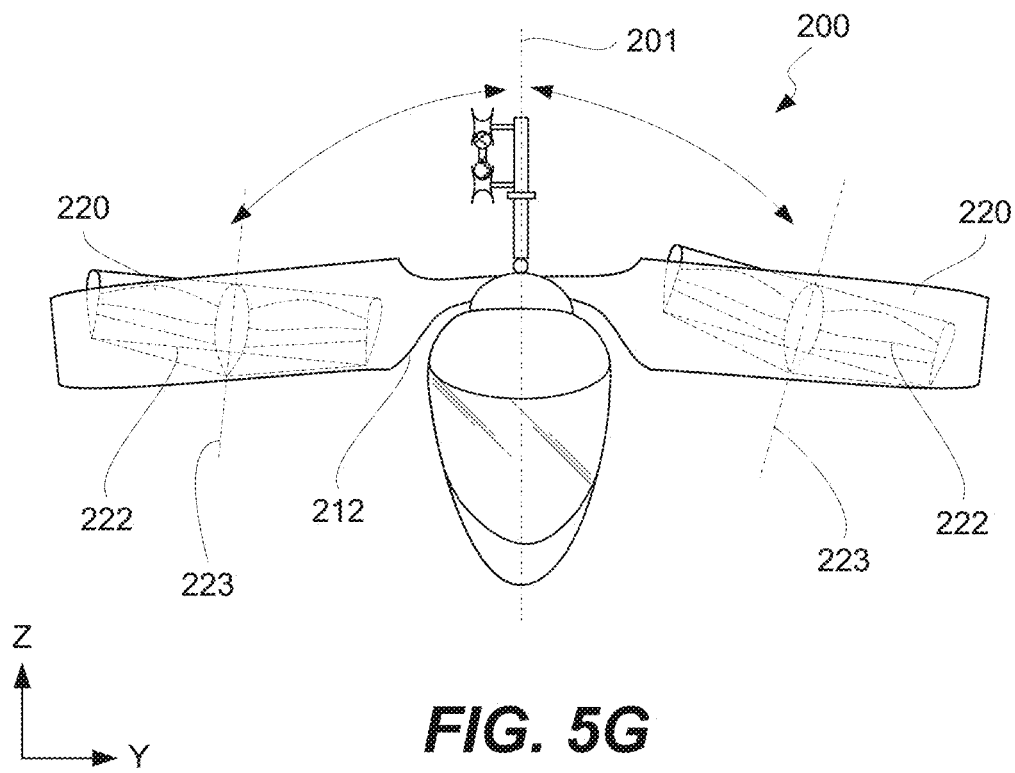

As shown in FIGS. 2A, 5F, and 5G, each vertical thruster 220 comprises vertical thrust rotor 222. The speed of vertical thrust rotor 222 determines the level of vertical thrust, which can be varied by varying the speed, as described above. In some examples, thrust rotor 222 is surrounded by module frame 212, for example, to protect thrust rotor 222 from contacting surrounding objects, such as power line 110.

Vertical thrust rotor 222 may be pivotable relative to module frame 212 as, for example, schematically shown in FIGS. 5F and 5G. Specifically, the angle of rotational axis 223 of each one of vertical thrust rotors 222 relative to main vertical axis 201 of aircraft 200 (extending along the Z axis) may be independently controllable. Similar to the rotor speeds, this rotor pivoting feature allows precisely controlling the position of aircraft 200 and is important during tethered flights and establishing connections to power line 110. This feature may be referred to as vertical thrust vectoring or, with multiple vertical thrusters 220 present at aircraft 200, vertical multi-axis vertical thrust vectoring.

Referring to FIGS. 2A and 2B, connecting module 240 of aircraft 200 is configured to form a connection with power line 110 and maintain this connection during the tethered flight. More specifically, this connection may be a power connection and used to transmit electrical energy from power line 110 to propulsion module 210. In some examples, connecting module 240 is configured to form an inductive power connection (using magnetic field generated by power line 110). The inductive power connection may still involve direct mechanical contact between connecting module 240 and power line 110 (e.g., to maintain a set distance between power transmitting components). Alternatively, the inductive power connection may be formed without any direct mechanical contact between connecting module 240 and power line 110. For example, the inductive power connection allows using power line 110 with an insulating outer layer.

Figure 4A:
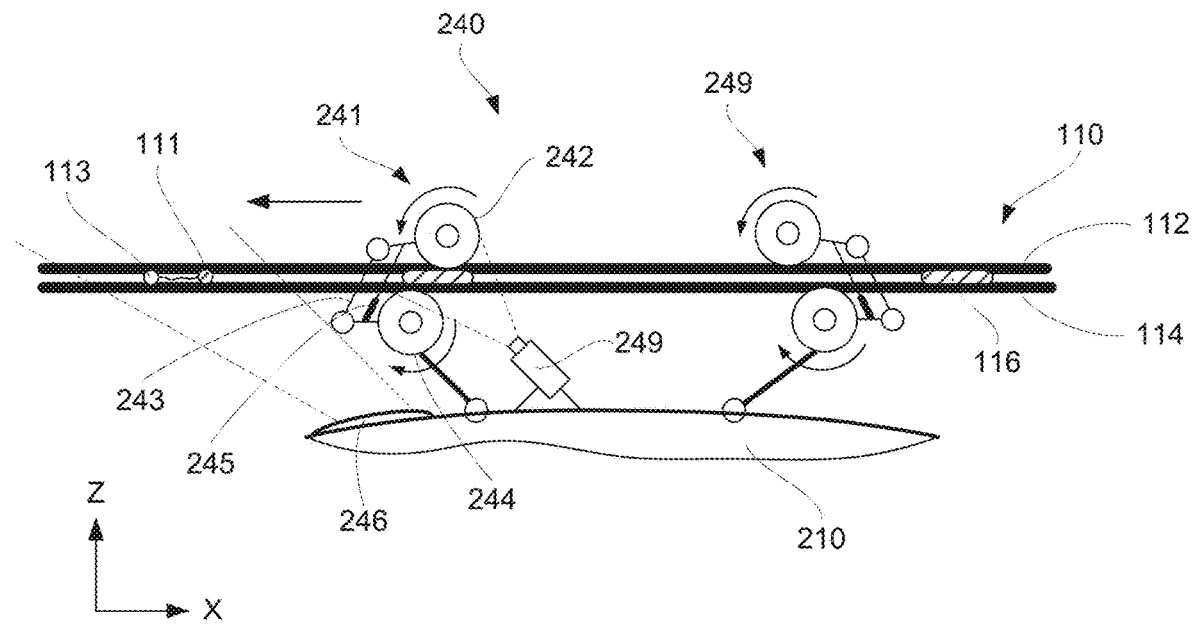
FIGS. 4A and 4B are schematic illustrations of a connecting module of the aircraft forming a connection to a power line, in accordance with some examples.

Another example of a power connection is a direct electrical connection with power line 110 through a direct physical contact between connecting module 240 and power line 110. In this example, a conductive element of connecting module 240 touches a corresponding conductive element of power line 110. For example, FIG. 4A illustrates connecting module 240 comprising connector 241, which in turn comprises support 243 and contact 242. In this example, contact 242 is rotatably coupled to support 243. Contact 242 may be a roller. During tether flights, contact 242 forms a direct physical contact with and rolls over conductor 112 of power line 110. This rolling feature allows aircraft 200 to fly along power line 110 without creating friction forces between contact 242 and power line 110 and wearing these components.

In some examples, contact 242 or connecting module 240 comprises load cell 248 configured to monitor the load between contact 242 and power line 110. The output of load cell 248 may be used for flight control in order to maintain the contact with power line 110. At the same time, the force between contact 242 and power line 110 may not exceed a set threshold to avoid damage to contact 242 and/or power line 110. Furthermore, the output of load cell 248 may be used when aircraft 200 is used to support power line 110 as further described below with reference to FIGS. 6B and 6C.

Figure 4B:
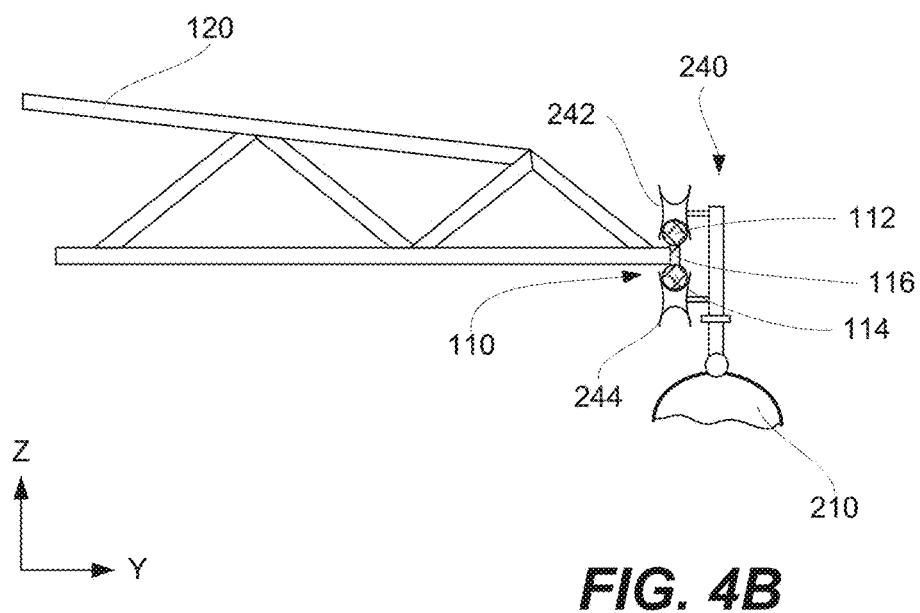

In some examples, connector 241 further comprises additional contact 244 rotatably coupled to support 243. Additional contact 244 may be used to form a direct electrical connection to additional conductor 114 of power line 110 as, for example, shown in FIGS. 4A and 4B. In this example, additional conductor 114 is positioned under conductor 112. Support structure 116 may be positioned in between conductor 112 and additional conductor 114 to support conductor 112 and additional conductor 114 relative to each other and, for example, relative to pylon 120 as shown in FIG. 4B.

In some examples, connector 241 further comprises coupling mechanism 245 as shown in FIGS. 4A and 5C, for controlling position of contact 242 and additional contact 244 relative to each other. For example, coupling mechanism 245 may be a mechanical, electrical, or hydraulic actuator, configured to urge contact 242 and additional contact 244 toward each other when connecting module 240 forms a direct mechanical connection with power line 110 during the tethered flight. In these examples, conductor 112 and additional conductor 114 of power line 110 may be positioned between contact 242 and additional contact 244. Therefore, coupling mechanism 245 urges contact 242 against conductor 112 and also urges additional contact 244 against additional conductor 114, at the same time. Coupling mechanism 245 may be controlled based in input from load cell 248.

Support 243 of connector 241 may be coupled to propulsion module 210. Support 243 may be a structure extending between propulsion module 210 and contact 242 and providing a safe distance between power line 110 and propulsion module 210, e.g., to avoid any direct contact between power line 110 and propulsion module 210, when establishing, maintaining, and breaking connection with power line 110. Furthermore, the separation between power line 110 and propulsion module 210 reduces movements of power line 110 in response to air flows generated by vertical thrusters 220 and/or horizontal thruster 230 of aircraft 200.

In some examples, connector 241 further comprises gyro-mechanism 214. Gyro-mechanism 214 may pivotably couple support 243 to propulsion module 210 as, for example, shown in FIG. 5C. Gyro-mechanism 214 moves propulsion module 210 (e.g., changes angle, turns, swivels) relative to support 243 while connecting module 240 maintains a tethered connection to power line 110. Gyro-mechanism 214 may be configured to maintain a direct physical contact (for direct electrical coupling) or a set distance (for inductive coupling) between connecting module 240 and power line 110 during the tethered flight. It should be noted that this contact or this set distance is maintained even while position of aircraft 200 relative to power line 110 changes as, for example, schematically shown in FIGS. 5D and 5E. Gyro-mechanism 214 may comprise a gyroscopic sensor and, in some examples, a tilt sensor coupled to an electrical motor used to change the angular position of support 243 relative to propulsion module 210. Gyro-mechanism 214 may be controlled by flight controller 270 or other controllers, e.g., a controller of connecting module 240 responsible for maintaining a connection to power line 110.

Establishing the relative position of aircraft 200 and power line 110 or, more specifically, establishing the relative position of contact 242 of aircraft 200 and conductor 112 of power line 110, while forming and maintaining a connection between these two components, can be challenging. First, precisely identifying the location of conductor 112, which itself may be relatively small in comparison to the operating space of aircraft 200, can be difficult. Furthermore, the location of aircraft 200 and power line 110 can be very dynamic. Aircraft 200 can move in response to its own controls and external factors, e.g., wind gusts. These external factors may also influence the position of power line 110 in addition to air flows produced by aircraft 200. Various locating features may be used on aircraft 200 and, in some examples, on power line 110 to assist with this positioning operation.

In some examples, connecting module 240 comprises locating mechanism 247 as, for example, shown in FIGS. 5A and 5B. Locating mechanism 247 is an example of a mechanical locating feature. Locating mechanism 247 is configured to physically engage power line 110 or, more specifically, conductor 112 of power line 110 and to establish and control the position of connecting module 240 relative to power line 110 prior to and while forming direct mechanical with power line 110. For example, locating mechanism 247 may have a hook-shape. Locating mechanism 247 may be dropped on power line 110 and pulled back until locating mechanism 247 engages (e.g., hooks) a conductor (conductor 142 in FIGS. 5A and 5B). At this point, the relative position of connecting module 240 to power line 110 is established and contact 242 may be advances toward power line 110. Locating mechanism 247 may be disengaged after the connection is established (e.g., during a tethered flight). Alternatively, locating mechanism 247 may continuously engage power line 110 while the connection is maintained.

In the same or other examples, connecting module 240 comprises camera 249, configured to capture images (e.g., video image) of contact 242 of connecting module 240 and its surroundings (e.g., conductor 112 of power line 110 when contact 242 approaches and forms contact with conductor 112). The images captures by camera 249 may be used by a pilot or, in the case of an unmanned version of aircraft 200, by flight controller 270 to establish and maintain connection with power line 110. For example, flight controller 270 may be configured to analyze images from camera 249 to determine the relative orientation of contact 242 and conductor 112.

In some examples, connecting module 240 comprises radio-frequency identification (RFID) reader 246. RFID reader 246 is configured to scan and read RFID tags 111 installed on power line 110. RFID tag 111 may be encoded with information about position of RFID tag 111 in space (e.g., spatial coordinates). This position may be referred to as a static position, which is a position absent external air flows (wind or generated by aircraft 200) and temperature fluctuations. The position information may be used by connecting module 240 and, more generally, by aircraft 200 to bring contact 242 to this position and establish connection with power line 110. It should be noted that the position of RFID tag 111 in space may be dynamic (e.g., due to air flows and temperature fluctuations). To account for at least some of these dynamic conditions, power line 110 may comprise accelerometer 113, which is configured to capture the local movement of power line 110 and to provide additional information to RFID tag 111. RFID tag 111, in turn, transmits this dynamic and static location information to RFID reader 246. RFID reader 246 and camera 249 are examples of contactless locating features.

Overall, one or more locating features may be used for establishing contact between connecting module 240 and power line 110. For example, RFID reader 246 may be used rough estimates of power line 110. Camera 249 and/or locating mechanism 247 may be used for more precise location of power line 110 relative to contact 242.

Figure 3:
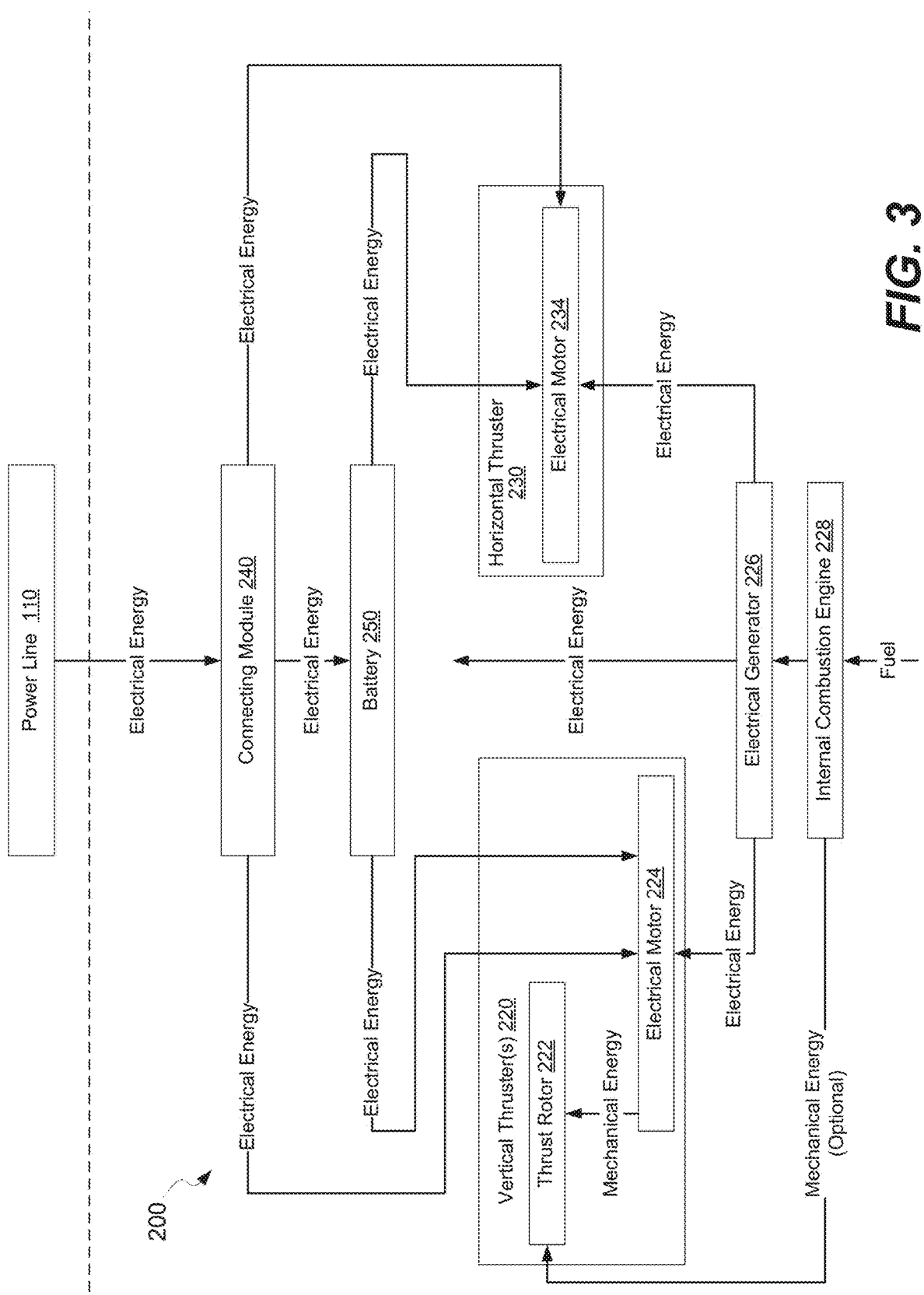
FIG. 3 is a schematic illustration of different power components of the aircraft and electrical energy transfers among these components, in accordance with some examples.

As described above, aircraft 200 may receive electrical energy from power line 110, store electrical energy onboard of aircraft 200, and/or generate electrical energy onboard of aircraft 200. FIG. 3 is a schematic illustration of different power components of aircraft 200 and examples of different flows of the electrical energy during operation of aircraft 200. Specifically, aircraft 200 may comprise battery 250 for storing the energy and/or electrical generator 226 for generating the energy on board of aircraft 200.

Battery 250, when one is present, is electrically coupled to connecting module 240, electrical generator 226, vertical thruster 220, and horizontal thruster 230. Specifically, battery 250 is configured to charge, for example, while aircraft 200 has a power connection to power line 110, using electrical energy received from connecting module 240. Battery 250 may be also charged using electrical energy produced by electrical generator 226, e.g., during the flight (tethered or untethered) or while aircraft 200 is landed. In some examples, battery 250 may be charged using an external power source, different from power line 110, e.g. while aircraft 200 is landed. For example, battery 250 may be charged from an external generator, a power grid (which may be integrated with or be separate from power line 110), and other like sources.

Battery 250 is also configured to discharge, for example, during the untethered flight and to deliver electrical energy to vertical thruster 220, horizontal thruster 230 and/or other electrical components of aircraft 200. More specifically, vertical thruster 220 may be equipped with electrical motor 224 connected to battery 250 and, in some examples, to connecting module 240 and/or electrical generator 226. Unlike internal combustion engines, electrical motor 224 is highly dynamic (can rapidly accelerate and decelerate), more efficient, quiet, and more environmentally friendly. Likewise, horizontal thruster 230 may be equipped with electrical motor 234, connected to battery 250 and, in some examples, to connecting module 240 and/or electrical generator 226.

In some examples, aircraft 200 comprises electrical generator 226. Electrical generator 226 may be coupled to internal combustion engine 228 (e.g., a turbine engine, a piston engine, and the like). Electrical generator 226 may generate electrical energy by converting mechanical energy, received from internal combustion engine 228. In some examples, internal combustion engine 228 may be mechanically coupled to thrust rotor 222 of vertical thruster 220. In other words, internal combustion engine 228 may provide mechanical energy directly to vertical thruster 220 without converting at least this portion of the mechanical energy to electrical energy first.

Figure 6A:
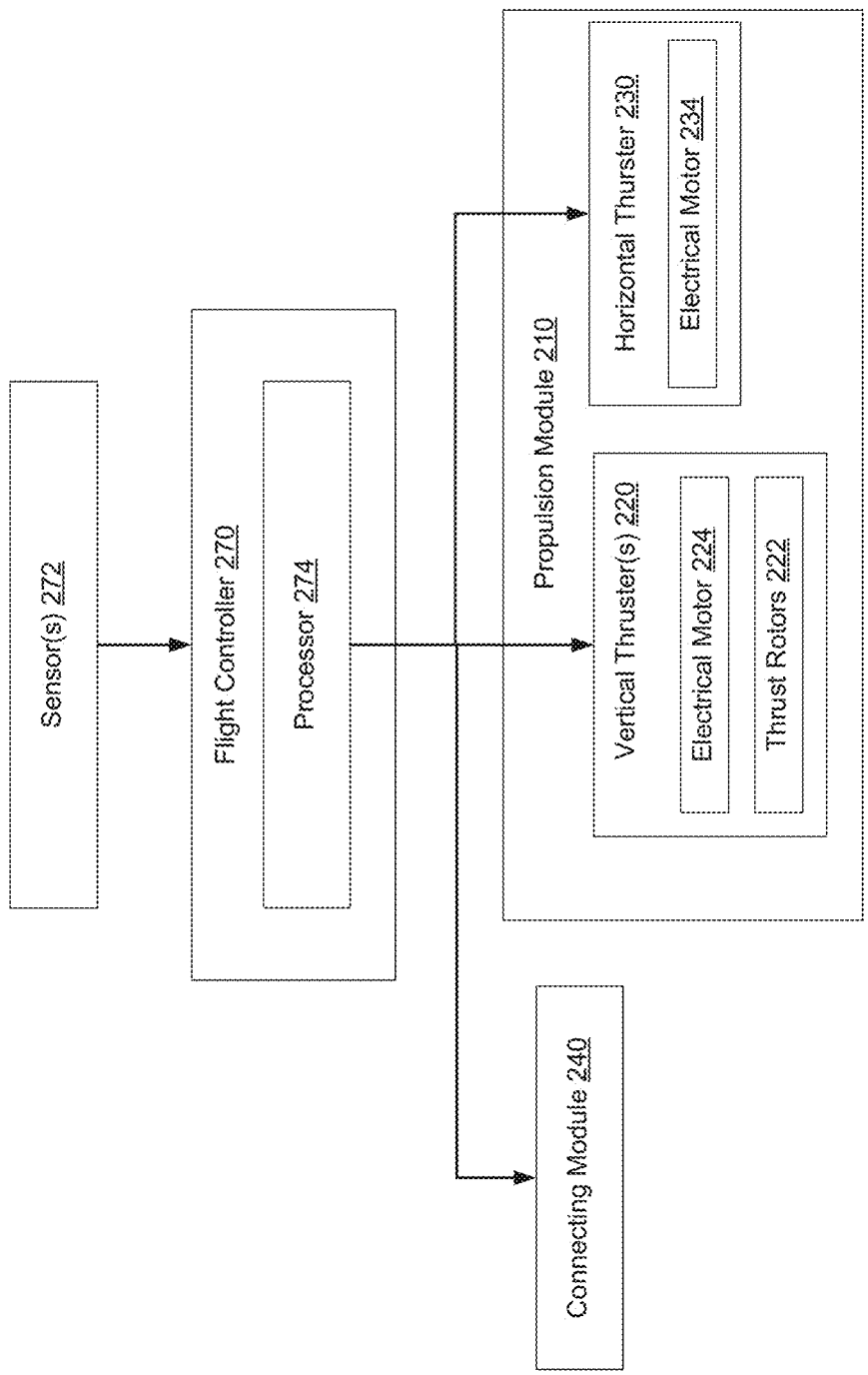
FIG. 6A is a schematic illustration of control components of the aircraft, in accordance with some examples.

In some examples, aircraft 200 further comprises flight controller 270 as, for example, schematically shown in FIG. 6A. Flight controller 270 may be configured to control various operations of propulsion module 210 (e.g., vertical thruster 220 and horizontal thruster 230) and connecting module 240. For example, flight controller 270 may control the speed of electrical motor 224 of vertical thruster 220 and/or the speed of electrical motor 234 of horizontal thruster 230, thereby controlling the vertical thrust (lift) and horizontal thrust as well as roll, yaw, and pitch of aircraft 200. Furthermore, flight controller 270 may control the tilt of thrust rotor 22 of vertical thruster 220. In more specific examples, flight controller 270 is configured to control all operations of propulsion module 210 and connecting module 240, and aircraft 200 may be an unmanned aerial vehicle.

Figure 6B:
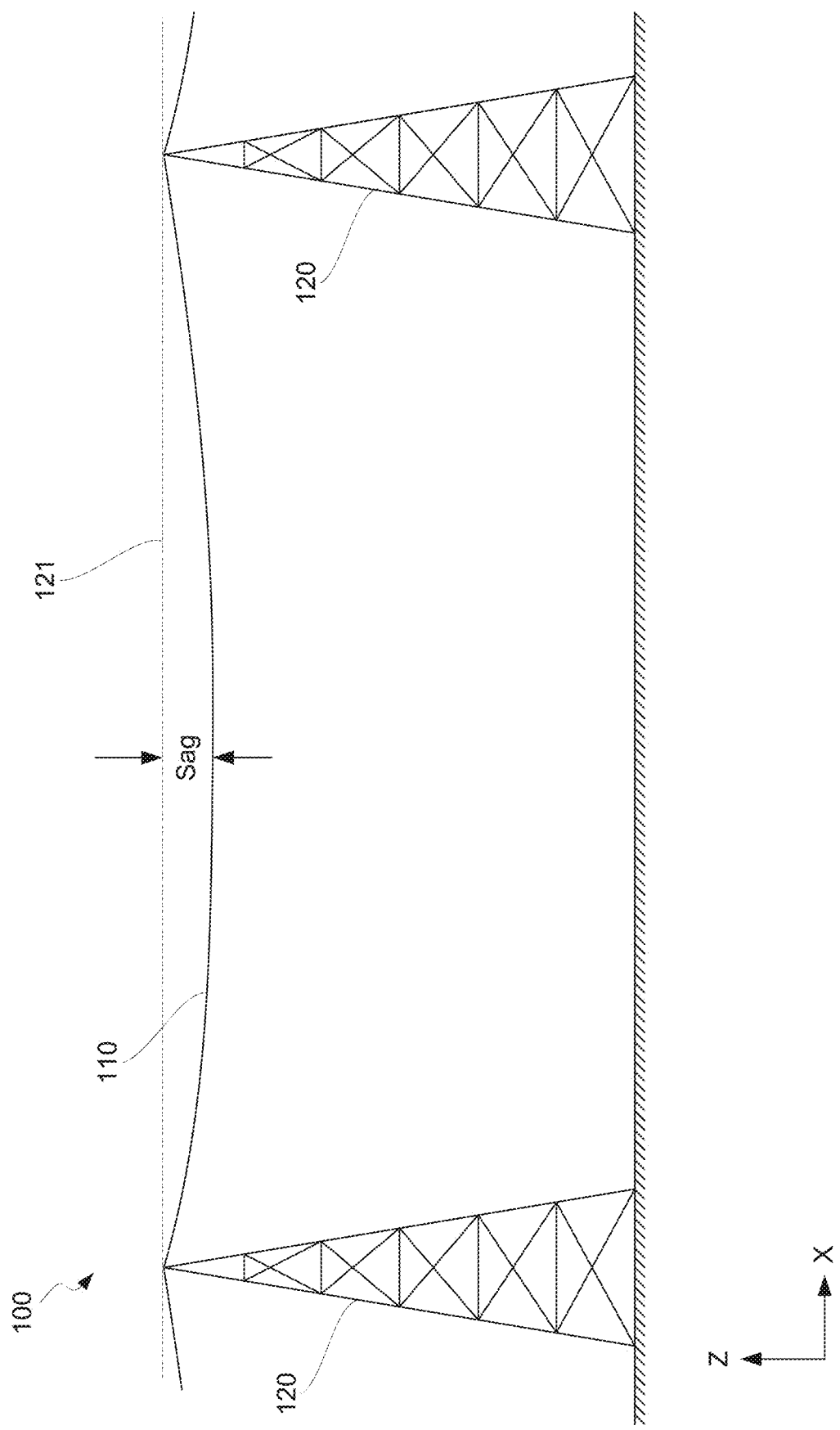
FIG. 6B is a schematic illustration of a power line, before the aircraft has connected to the power line, in accordance with some examples.
Figure 6C:
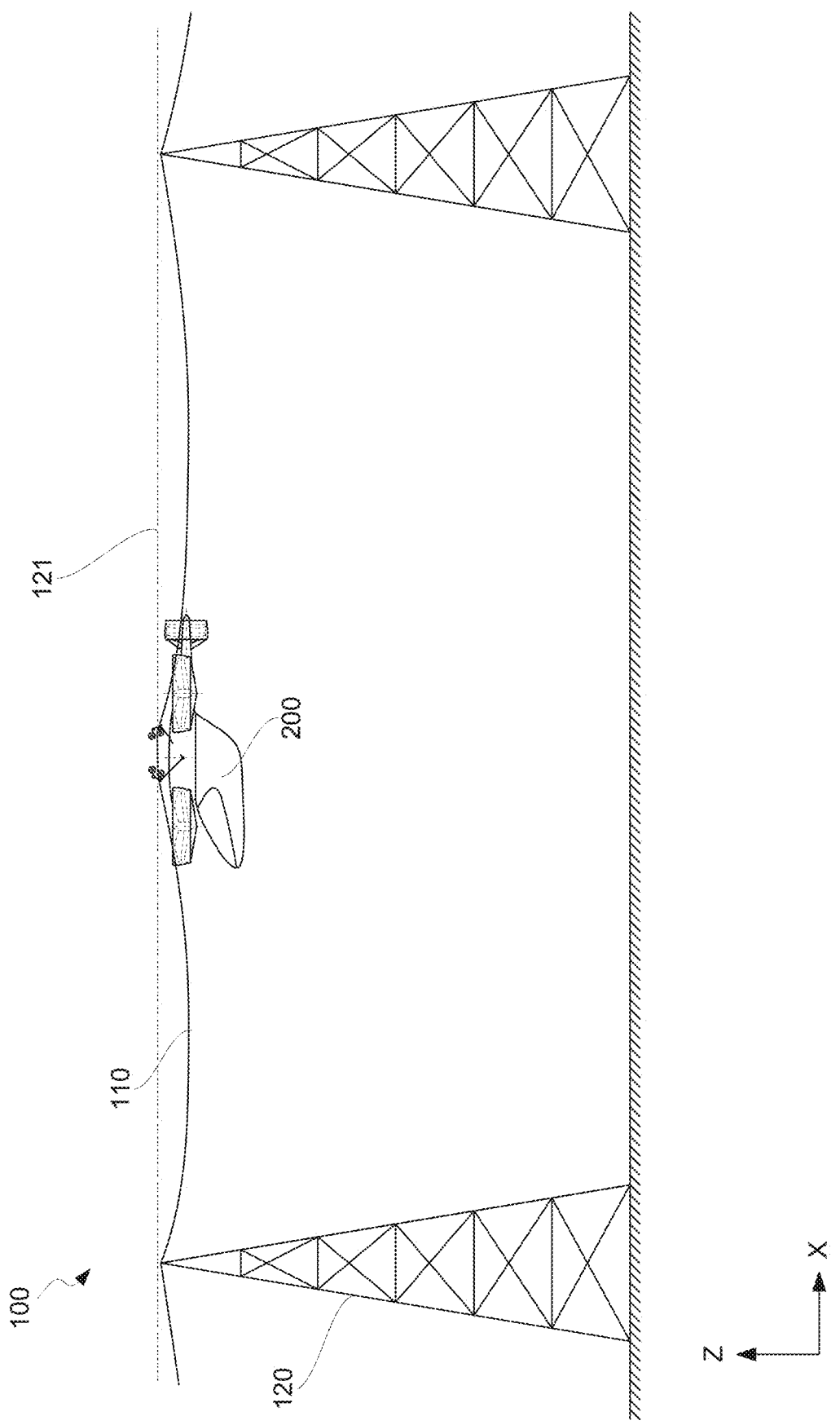
FIG. 6C is a schematic illustration of the power line of FIG. 6B, after the aircraft has connected the power line, partially supported by the aircraft, in accordance with some examples.

In some examples, one operating aspect of aircraft 200, which may be fully or at least partially controlled using flight controller 270, is related to sagging of power line 110 under the gravity as, for example, schematically shown in FIG. 6B. For purposes of this disclosure, the sag is defined as the shortest distance between power line 110 and straight line 121, extending between two support points of power line 110, e.g., the pylons. The amount of sag depends on the tension, weight, flexibility, and other characteristics of power line 110 as well as the distance between the support points (e.g., pylons 120). If aircraft 200, carrying passengers and travelling along the X direction, follows the sag in power line 110, the passengers may experience motion sickness because of the constant up and down motion (along the Z direction) of aircraft 200 as aircraft 200 travels between and past the support points of power line 110. Furthermore, aircraft 200, when directly contacting power line 110, may cause additional tension on power line 110, e.g., in addition to the gravitation causing power line 110 to sag. To avoid this up and down motion and to minimize the tension on power line 110, aircraft 200 may provide support to power line 110, similar to pylons 120. FIG. 6C illustrates aircraft 200 raising power line 110 in between pylons 120 and at the location of aircraft 200. In this example, aircraft 200 has raised power line 110 to the level corresponding to straight line 121 between the support points of power line 110. However, aircraft 200 can raise power line 110 to any other level between straight line 121 and the maximum sag. This feature allows aircraft 200 travel to between pylons 120 along straight line 121 without experiencing any (or significant) up and down motion. Flight controller 270 may be used to adjust the lift and other characteristics of aircraft 200 to provide support to power line 110 and ensure the desired travel path of aircraft 200.

Examples of Aircraft Operating Methods

Figure 7:
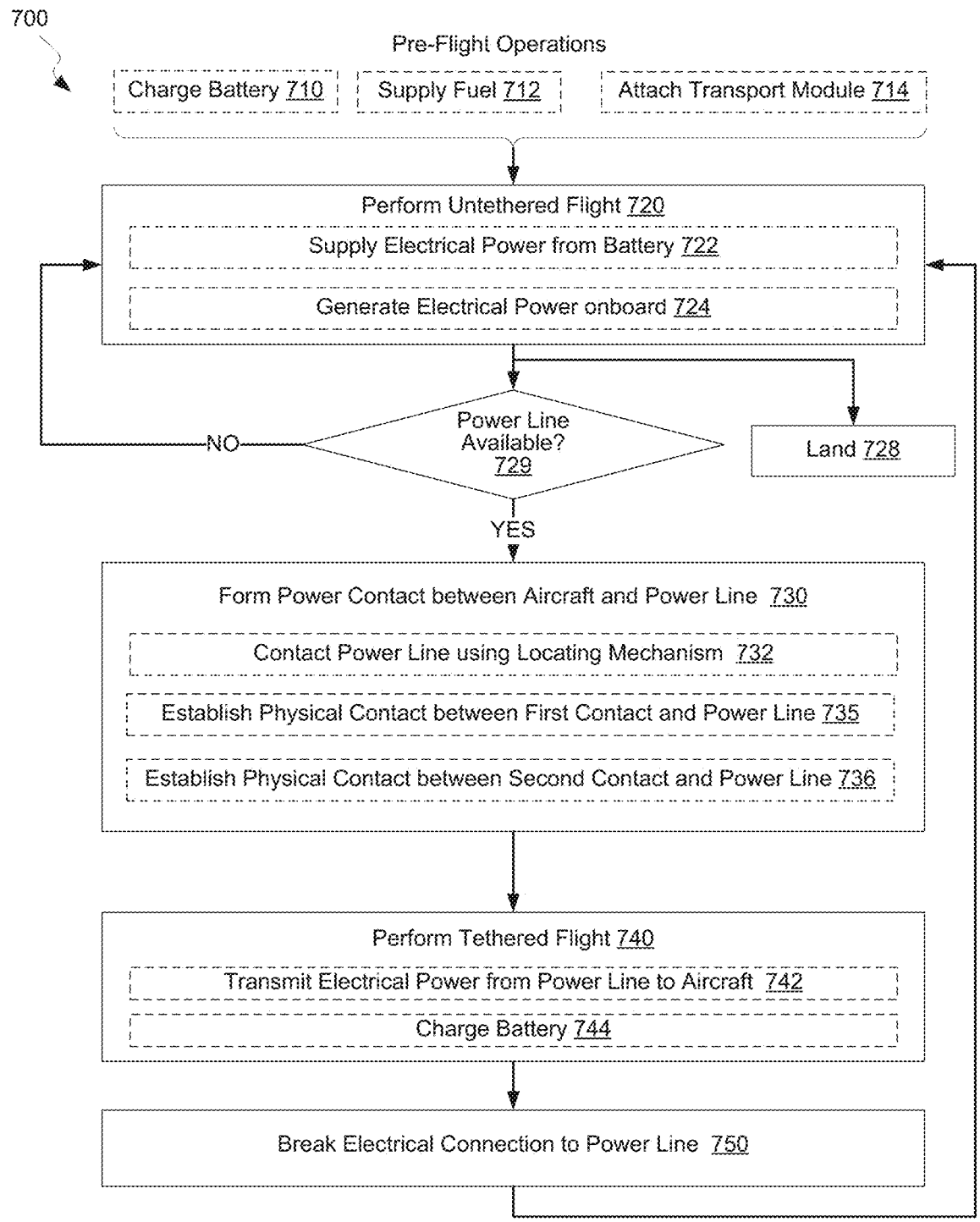
FIG. 7 is a process flowchart corresponding to a method of operating the aircraft, in accordance with some examples.

FIG. 7 is a process flowchart corresponding to method 700 of operating aircraft 200, in accordance with some examples. Various examples and features of aircraft 200 are described above. For example, aircraft 200 comprises propulsion module 210, connecting module 240, and, in some examples, transport module 280. As states above, aircraft 200 may perform various operations without transport module 280 being a part of aircraft 200 and attached to propulsion module 210. Furthermore, some or all operations may be performed without a pilot. More specifically, aircraft 200 may be an unmanned aerial vehicle.

Various operations may be performed while aircraft 200 is landed, e.g., on the ground or on a designated landing pad. These operations may be collectively referred to pre-flight operations. Some examples include charging battery 250 (block 710 in FIG. 7), supplying fuel for powering internal combustion engine 228 (block 712), and attaching transport module (block 714). It should be noted that even when aircraft 200 is landed, aircraft 200 may be still tethered to power line 110, at least in some example. For example, aircraft 200 may be landed a designated landing pad near power line 110.

Alternatively, aircraft 200, when landed, may be untethered from power line 110. For example, aircraft 200 may first disconnect from power line 110 and perform an untethered flight prior to its landing. In a similar manner, aircraft 200 may perform an untethered flight after taking off from its landing prior to connect to power line 110. In some examples, aircraft 200 performs landing and/or takeoff while tethered to power line 110.

Referring to block 710 in FIG. 7, in some examples, method 700 comprises charging battery 250. Specifically, battery 250 may be charged such that battery 250 is able provide electrical energy to propulsion module 210 while aircraft 200 is performing its untethered flight, as further describe below. Battery 250 may be charged using an external power source (e.g., power grid, external generator) and/or internal power source (e.g., electrical generator 226 onboard of aircraft 200). In some examples, electrical generator 226 may be operable as a range extender and may not be sufficiently powerful to provide all electrical power need for untethered flight of aircraft 200. In these examples, electrical power is entirely or additional supplied from battery 250.

Referring to block 712 in FIG. 7, in some examples, method 700 comprises supplying fuel to aircraft 200. As described above, aircraft 200 may be equipped with internal combustion engine 228 for operating electrical generator 226 and/or provide mechanical energy directly to vertical thruster 220. The fuel is used by internal combustion engine 228 during its operation.

Referring to block 714 in FIG. 7, in some examples, method 700 comprises attaching transport module 280 to propulsion module 210. This operation may be performed while aircraft 200 is landed. Alternatively, this operation may be performed during light, a least in some examples. Aircraft 200 comprising propulsion module 210 and connecting module 240, but not transport module 280, may fly over transport module 280, which may be on the ground or lifted of the ground to aircraft 200 hoovering above transport module 280. Transport module 280 is then attached to propulsion module 210 by propulsion module 210 lowering onto transport module 280 or raising transport module 280 toward propulsion module 210. Transport module 280 may replace another transport module to change configuration of aircraft 200 (e.g., from passenger to transport) or save time on loading/unloading transport module 280.

Referring to block 720 in FIG. 7, method 700 comprises performing an untethered flight of aircraft 200. For example, aircraft 200 may fly from its landing spot (e.g., on the ground) to power line 110, which may be above the ground or simply away from aircraft's previous landing spot. The ability to perform the untethered flight greatly increases the operating range and functionality of aircraft 200. Furthermore, this ability eliminates the need for power line 110 to extend to all possible flight locations of aircraft 200. Finally, this ability allows positioning power line 110 away from the ground (e.g., for safety) while still land aircraft 200 on the ground.

Referring to block 722 in FIG. 7, in some examples, performing the untethered flight comprises supplying electrical energy from battery 250. Specifically, battery 250 may supply power to vertical thruster 220 and/or horizontal thruster 230. Battery 250 may be previously charged using the electrical energy supplied from power line 110 (e.g., during the tethered flight of aircraft 200), from electrical generator 226 (e.g., during tethered or untethered flight or while aircraft 200 is on the ground), and/or from another other power source (e.g., while aircraft is on the ground). The capacity of battery 250 may be sufficient to complete the entire untethered flight. Alternatively, some or all of the electrical energy for the untethered flight is supplied from another source, such as electrical generator 226.

Referring to block 724 in FIG. 7, in some examples, performing the untethered flight of aircraft 200 comprises generating electrical energy with electrical generator 226. This generated power may be supplied to vertical thruster 220 and/or horizontal thruster 230. Specifically, the electrical energy produced by electrical generator 226 may be sufficient for the untethered flight without a need for any electrical energy from battery 250. In some examples, the electrical energy produced by electrical generator 226 may be used to charge battery 250, even during the tethered flight.

Referring to decision block 729 in FIG. 7, if power line 110 is available, method 700 may proceed with forming a power contact between aircraft 200 and power line 110 (block 730). The power contact may be also referred to as an electrical connection. Alternatively, aircraft 200 may continue its untethered flight (block 720) and land (block 728) without forming the power contact to power line 110.

Referring to the operation corresponding to block 730, the power contact electrical connection between aircraft 200 and power line 110 may be formed using connecting module 240 of aircraft 200. Various examples and features of connecting module 240 are described above. In some examples, the electrical connection formed between aircraft 200 and power line 110 is an inductive connection. Inductive connection or inductive coupling is an example of wireless energy transmission without wires as a physical link. It may use time-varying electric, magnetic, or electromagnetic fields. In these examples, connecting module 240 may be positioned proximate to power line 110 or contacting power line 110. Alternatively, the electrical connection is a direct connection in which connecting module 240 (or, more specifically, an electrically conductive component of connecting module 240) physically contacts power line 110 (or, more specifically, an electrically conductive component of power line 110) and electrons flow through this physical contact.

Referring to block 732 in FIG. 7, forming the electrical connection between aircraft 200 and power line 110 may comprise contacting power line 110 using locating mechanism 247. For example, locating mechanism 247 may be placed on power line 110 and then retracted until engaging power line 110 as, for example, shown in FIG. 5B. This operation allows establishing the relative orientation between aircraft 200 and power line 110, which may be needed before engaging contact 242 and/or contact 244.

Referring to block 735 in FIG. 7, forming the electrical connection between aircraft 200 and power line 110 may comprise establish physical contact between contact 242 and power line 110. For example, contact 242 may be a roller (e.g., a pulley-like roller), which is lower onto conductor 112. Locating mechanism 247, if one is used, may continue to engage power line 110 during operation. Furthermore, this operation may involve monitoring when contact between aircraft 200 and power line 110 is established, e.g., monitoring voltages at contact 242.

Referring to block 736 in FIG. 7, forming the electrical connection between aircraft 200 and power line 110 may comprise establish physical contact between additional contact 244 and power line 110. For example, additional contact 244 may be another roller (e.g., a pulley-like roller), which is brought in contact with additional conductor 114. Locating mechanism 247, if one is used, may continue to engage power line 110 during operation. Furthermore, this operation may involve monitoring when contact between aircraft 200 and power line 110 is established, e.g., monitoring voltages at additional contact 244. Finally, this operation may be performed after or in parallel with establishing the physical contact between contact 242 and power line 110, described above.

Referring to block 740 in FIG. 7, method 700 comprises performing a tethered flight of aircraft 200. The tethered flight is performed while maintaining electrical connection between power line 110 and aircraft 200. In some examples, the tether flight may involve transmitting electrical energy from power line 110 (referring to block 742 in FIG. 7) to propulsion module 210 during the tethered flight. Propulsion module 210, in turn, uses this electrical energy to generate vertical lift and thrust using its components. Aircraft 200 moves along power line 110 during this operation without breaking the electrical power connection.

In some examples, performing the tethered flight of aircraft 200 comprises charging battery 250 (referring to block 744 in FIG. 7). For example, battery 250 may be charged using a part of the electrical energy transmitted from power line 110. The remaining electrical energy is used by propulsion module 210 to generate the vertical lift and thrust. In some examples, battery 250 may be charged using electrical energy produced by electrical generator 226, onboard of aircraft 200.

Referring to block 750 in FIG. 7, method 700 further comprises breaking electrical connection between aircraft 200 and power line 110 and performing untethered flight of aircraft 200 after breaking electrical connection. For example, aircraft 200 may need to land on the ground while power line 110 may be positioned away from the ground. Alternatively, the electrical connection may be broken and reestablished, with a brief untethered flight in between these operations, to overcome various obstacles on the way of aircraft.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

The invention claimed is:

1. An aircraft configured to perform a tethered flight and an untethered flight, the aircraft comprising:
    a propulsion module, comprising a vertical thruster configured to generate lift;
    a connecting module, comprising a gyro-mechanism, a support, and a contact,
        wherein the contact is rotatably coupled to the support and configured to form power connection with a power line during the tethered flight to transmit electrical energy from the power line to the propulsion module,
        wherein the gyro-mechanism pivotably couples the support of the connecting module to the propulsion module such that the support is free to swivel relative to the propulsion module; and
    a transport module, coupled to the propulsion module and configured to transport one or more of cargo and passengers.

2. The aircraft of claim 1, wherein the transport module is detachably coupled to the propulsion module.

3. The aircraft of claim 1, wherein the transport module is selected from the group consisting of a passenger transport module, a container transport module, and an ore transport module.

4. The aircraft of claim 1, further comprising a battery, electrically coupled to the connecting module and the vertical thruster, wherein the battery is configured to charge during the tethered flight using the electrical energy received from the connecting module.

5. The aircraft of claim 4, further comprising an electrical generator coupled to the battery and configured to generate electrical energy to charge the battery using an internal combustion engine.

6. The aircraft of claim 1, wherein the propulsion module further comprises a module frame, wherein a rotational axis of a thrust rotor of the vertical thruster is pivotable relative to the module frame.

7. The aircraft of claim 6, wherein the module frame surrounds the thrust rotor.

8. The aircraft of claim 1, wherein the connecting module is configured to form an inductive connection with the power line during the tethered flight.

9. The aircraft of claim 1, wherein the connecting module is configured to form a direct mechanical connection with the power line during the tethered flight.

10. The aircraft of claim 9, wherein the connecting module comprises a connector comprising the support and the contact.

11. The aircraft of claim 10, wherein the connector further comprises an additional contact, wherein the additional contact is rotatably coupled to the support.

12. The aircraft of claim 11, wherein the connector further comprises a coupling mechanism, controlling position of the contact, and the additional contact relative to each other.

13. The aircraft of claim 12, wherein the coupling mechanism is configured to urge the contact and the additional contact toward each other when the connecting module forms the direct mechanical connection with the power line during the tethered flight.

14. The aircraft of claim 1, wherein the gyro-mechanism is configured to maintain the direct mechanical connection between the connecting module and the power line during the tethered flight, while position of the aircraft, relative to the power line, changes.

15. The aircraft of claim 1, further comprising a flight controller, wherein the flight controller is configured to control at least some operations of the propulsion module and the connecting module.

16. The aircraft of claim 1, further comprising a flight controller, wherein the flight controller is configured to control all operations of the propulsion module and the connecting module.

17. The aircraft of claim 1, wherein the vertical thruster is a part of multiple vertical thrusters, configured to provide multi-axial thrust vectoring.

18. An aircraft configured to perform a tethered flight and an untethered flight, the aircraft comprising:
    a propulsion module, comprising a vertical thruster configured to generate lift;
    a connecting module, coupled to the propulsion module and configured to form a direct mechanical connection with a power line during the tethered flight to transmit electrical energy from the power line to the propulsion module,
        wherein the connecting module further comprises a locating mechanism,
        wherein the locating mechanism is configured to engage the power line and to control position of the connecting module relative to the power line prior to forming the direct mechanical connection with the power line, and
        wherein the locating mechanism has a hook-shaped; and
    a transport module, coupled to the propulsion module and configured to transport one or more of cargo and passengers.

19. A method of operating an aircraft, the method comprising:
    performing an untethered flight of the aircraft, wherein the aircraft comprises a propulsion module, a connecting module, and a transport module, wherein the propulsion module comprises a vertical thruster generating lift during the untethered flight, and wherein the transport module is coupled to the propulsion module and transports one or more of cargo and passengers;
    forming an electrical connection between the aircraft and a power line using the connecting module, wherein the connecting module comprises a support, a contact, an additional contact, and a coupling mechanism,
        wherein each of the contact and the additional contact is rotatably coupled to the support,
        wherein the coupling mechanism urges the contact and the additional contact toward each other when the connecting module forms a direct mechanical connection with the power line, and
        wherein the support is coupled to the propulsion module; and
    performing a tethered flight of the aircraft while maintaining the electrical connection between the power line and the aircraft, wherein the connecting module transmits electrical energy from the power line to the propulsion module during the tethered flight.

20. The method of claim 19, further comprising breaking the electrical connection between the aircraft and the power line and performing the untethered flight of the aircraft after breaking the electrical connection.

* * * * *